WALTER W. HAGNER
INVENTOR.

BY
Claude Funkhouser
ATTORNEY

United States Patent Office 3,276,471
Patented Oct. 4, 1966

3,276,471
SHUT-OFF VALVE
Walter W. Hagner, Rockville, Md., assignor to the United States of America as represented by the Secretary of the Navy
Filed June 17, 1963, Ser. No. 288,571
5 Claims. (Cl. 137—527)

This invention relates generally to valves, and more particularly to an improved, automatically operated valve of the pressure relief type.

Pressure relief valves are commonly employed in fluid distribution systems to prevent an excessive pressure build-up therein. Such a valve should be rapid in action, and should provide for a large flow volume to insure an adequate relief of undesirably high fluid pressure. Additionally, it is desirable that the valve be capable of resetting itself, thus making it continuously available for pressure relief. The valve of the subject invention satisfies each of these desirable characteristics.

It is an object of this invention to provide a fluid pressure relief valve so constructed as to be extremely rapid in operation..

Another object of the invention is to provide a pressure relief valve so constructed as to provide a relatively large fluid flow passageway for relieving fluid pressure.

It is also an object of this invention to provide a spring-biased pressure relief valve, so constructed that it will be automatically reset each time after functioning to relieve pressure.

A still further object of this invention is to provide a rapid operating relief valve so constructed that its operation is controlled throughout its movement.

Other objects and many of the attendant advantages of this invention will be readily appreciated as the same becomes better understood by reference to the following detailed description when considered in connection with the accompanying drawings, wherein.

Figure 1:
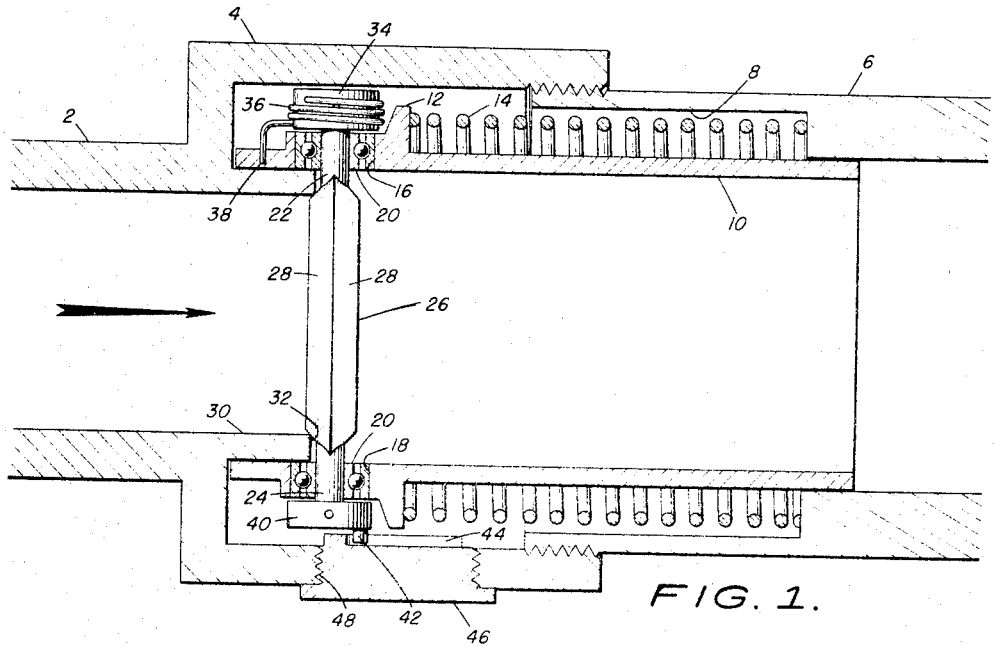
FIG. 1 is an axial section of the valve of the invention, showing the valve in its closed position.

The pressure relief valve of the present invention is inserted in a tubular conduit, and includes a disk pivotally mounted on its diameter and normally seated on a circular valve seat. The disk is carried by a spring-biased sleeve, which sleeve is moved back by fluid pressure to permit the valve disk to pivot to an open position. When the fluid pressure has been relieved to an acceptable level the valve disk is returned to its original position by resilient means, and the valve is again ready to function.

Referring now to the drawings, a tubular fluid supply conduit is shown at 2, and has an enlarged socket 4 thereon which is internally threaded at its open end. A tubular exhaust conduit 6 is threaded into the socket 4, and has a counterbore 8 therein. Slidably disposed within the conduit 6 is a carrier conduit or cylinder 10, said cylinder having a collar 12 thereon near the inner end thereof. A coil spring 14 is disposed in counterbore 8 and acts upon the collar 12 to urge the cylinder 10 toward the conduit 2.

Inwardly of the collar 12 the cylinder 10 has therein a pair of diametrically opposed transverse bores 16 and 18, within which are positioned bearing units 20. A pair of shafts 22 and 24 extend through the bearing units, and are connected to a valve disk 26, the latter having chamfered edges 28 thereon to facilitate sealing action. The supply conduit 2 has thereon an integral, cylindrical seat 30 which extends into the socket 4 and terminates in a sealing face 32. The cylinder 10 normally is urged toward said face 32 by spring 14 to firmly seat the valve disk 26 thereon, thus closing the passageway between the two conduits.

The shaft 22 has a collar 34 secured thereto outwardly of the bearing 20, said collar 34 having a spring 36 wrapped therearound. One end of the spring 36 is anchored to the collar 34, and the other end 38 thereof is secured, as by brazing, to the sleeve 10; thus, if the shaft 22 and the collar 34 are rotated, the spring 36 tends to return them to their original positions.

Figure 3:
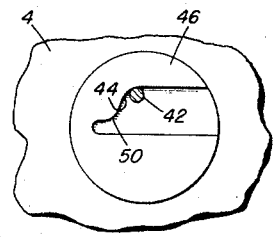
FIG. 3 is a detail section, taken on line 3—3 in FIG. 2, showing in plan view the cam guide for the valve.

A disk 40, having a projecting key 42 thereon, is secured to the shaft 24 for rotation therewith. The key 42 is received within a cam slot 44 in a cam guide member 46, the latter being cylindrical and being threadedly secured within an opening 48 in the socket 4. The shape of the slot 44 is best shown in FIG. 3.

Figure 2:
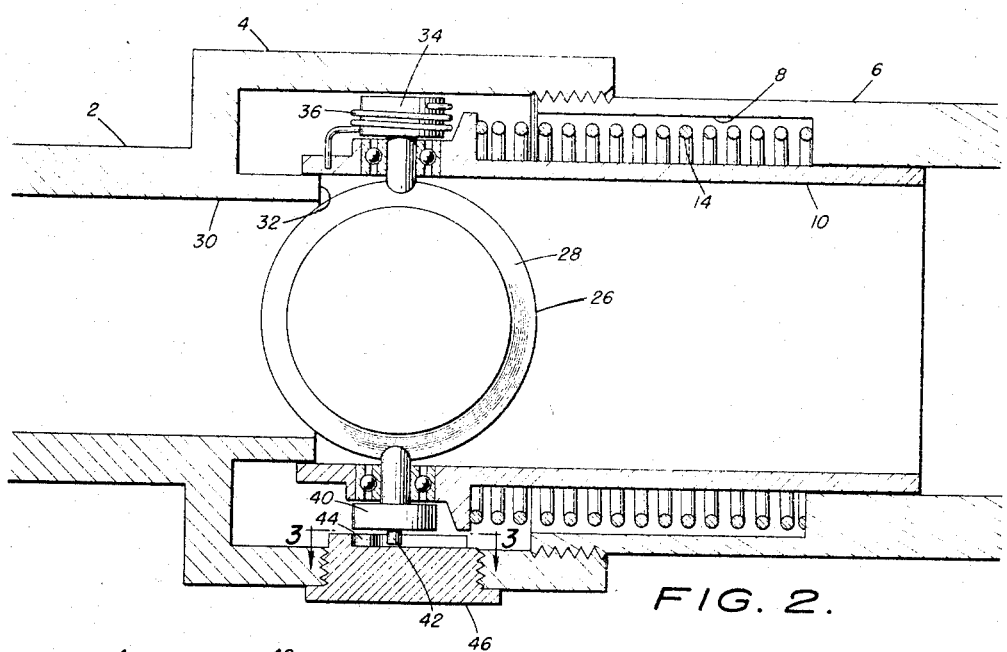
FIG. 2 is a section similar to FIG. 1, but showing the valve in its open position.

The manner in which the valve of the invention operates is best understood by a comparison of FIGS. 1 and 2. In FIG. 1 the valve is in its closed position. As pressure increases in conduit 2, it acts upon the valve disk 26 to urge the cylinder 10 back against the force of the spring 14. During the early portion of such movement the disk 26 is restrained from revolving by the key 42, which engages the front portion 50 of the cam surface 44. When the pressure has increased sufficiently, the cylinder 10 retracts far enough to permit the key 42 to rotate with the disk 26 about the axis of the shaft 24, and to permit the valve disk 26 to assume the position shown in FIG. 2. The valve is then open, and fluid pressure is relieved in the conduit 2 by the flow of fluid into the conduit 6.

When the fluid pressure has been sufficiently lowered below the force of the spring 14, the cylinder 10 again moves toward the seat 32. The disk 26 is then urged to revolve both by the cam surface 44 and by the spring 36, the spring 36 having been placed under stress by the motion of the disk 26 from the closed position shown in FIG. 1 to the open position of FIG. 2. The motion of the sleeve 10 continues until the disk 26 is again seated on the face 32.

Obviously, many modifications and variations of the present invention are possible in the light of the above teachings. It is therefore to be understood that within the scope of the appended claims the invention may be practiced otherwise than as specifically described.

What is claimed is:

1. A shut-off valve comprising
   a fluid supply conduit having an enlarged socket portion and a sealing face at one end thereof,
   an exhaust conduit attached to said socket portion,
   a carrier conduit slidable within said exhaust conduit,
   a valve disc pivotally mounted within said carrier conduit and normally in a closed position engaging said sealing face, said carrier conduit being movable by an increase in fluid pressure within said fluid supply conduit to disengage said valve plate from said sealing face, and
   cam means within said socket and attached to said valve disk and said carrier conduit for pivoting said valve disk to open position upon movement of said carrier conduit whereby the increase in fluid pressure within said fluid supply conduit will be relieved.

2. The valve structure of claim 1, wherein said exhaust conduit has a counterbore at one end thereof, and further including
   resilient means within said counterbore and engaging said exhaust conduit and said carrier conduit for urging said valve disk to engage said sealing face, said carrier conduit being movable against the urging of said resilient means by fluid pressure in said fluid supply conduit.

3. The valve structure of claim 2, and further including resilient means on said carrier conduit and on said valve disk for pivoting said valve disk to a closed position engaging said sealing face upon relief of fluid pressure in said fluid supply conduit and movement of said carrier conduit toward said fluid supply conduit by said first mentioned resilient means.

4. The valve structure of claim 1, wherein said valve disk has a key thereon, and further including a cam guide means within said socket and engaging said key for controlling the pivotal motion of said valve disk.

5. The valve structure of claim 1, wherein said exhaust conduit has a counterbore, and further including first resilient means within said counterbore and on said exhaust conduit and on said carrier conduit for urging said valve disk to engage said sealing face, said carrier conduit being movable against the urging of said first resilient means by fluid pressure in said fluid supply conduit, and second resilient means within said socket and on said carrier conduit and on said valve disk for pivotally urging said valve disk to a closed position engaging said sealing face upon relief of pressure in said fluid supply conduit and movement of said carrier conduit by said first resilient means.

References Cited by the Examiner

UNITED STATES PATENTS

| | | | |
|---|---|---|---|
| 265,053 | 9/1882 | Freeman | 137—324 |
| 1,330,265 | 2/1920 | Hinton | 137—527 |
| 2,824,755 | 2/1958 | Lamphear | 251—149.2 |

WILLIAM F. O'DEA, *Primary Examiner.*

ISADOR WEIL, *Examiner.*

D. ZOBKIW, *Assistant Examiner.*